United States Patent

Aelony et al.

[11] 4,110,379
[45] Aug. 29, 1978

[54] NOVEL HALOGENATED ORGANIC COMPOUNDS, PROCESS FOR THE PRODUCTION OF SAME, AND POLYURETHANES CONTAINING SAME

[75] Inventors: David Aelony, Beer-Sheva; David Vofsi, Rehovot, both of Israel

[73] Assignee: Makhteshim Chemical Works Ltd., Beer Sheva, Israel

[21] Appl. No.: 776,899

[22] Filed: Mar. 11, 1977

[30] Foreign Application Priority Data

Mar. 12, 1976 [IL] Israel .......................... 49209

[51] Int. Cl.² .................. C07C 91/06; C07C 91/08; C07C 93/04
[52] U.S. Cl. .................. 260/584 R; 260/584 B; 260/584 C; 521/115; 521/167
[58] Field of Search .......... 260/584 R, 584 B, 584 C, 260/2.5 AG

[56] References Cited

U.S. PATENT DOCUMENTS

| 3,325,476 | 6/1967 | Dowbenko | 260/584 R X |
| 3,894,070 | 7/1975 | Tomiyama et al. | 260/584 B X |
| 4,049,557 | 9/1977 | Wixon | 260/584 B X |

FOREIGN PATENT DOCUMENTS

| 527,462 | 7/1956 | Canada | 260/584 X |
| 49-21,123 | 5/1974 | Japan | 260/584 R |

Primary Examiner—Winston A. Douglas
Assistant Examiner—John J. Doll
Attorney, Agent, or Firm—Browdy and Neimark

[57] ABSTRACT

Compounds are disclosed of the formula

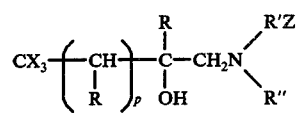

wherein
R designates hydrogen or an alkyl group of 1 to 6 carbon atoms, inclusive;
R' designates an alkylene group of 2 to 10 carbon atoms, inclusive, or alkylene substituted by a methyl or by a halomethyl group;
R" designates hydrogen, an alkyl group of 1 to 4 carbon atoms, inclusive;
—R"'Z,

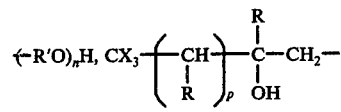

or C(CH$_2$OH)$_3$
X designates chlorine or bromine;
Z designates -OH,

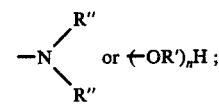

$n$ is an integer from 1 to 5; and
$p$ is an integer from 0 to 4.

A process for the production of such compounds is also disclosed which comprises reacting one mole or a slight excess of a trihalogenated alkylene oxide of the formula

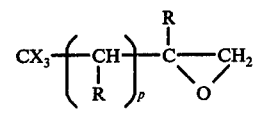

wherein X, R, and p are as defined above, per mole of an alkanolamine or polyamine of the formula

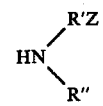

wherein R', R", Z, are as defined above, at a temperature between 30° to 90° C and separating the resulting halogenated nitrogen containing polyol.

Fire retardant polyurethane foam compositions may be prepared by reacting an organic polyisocyanate, a polyhalogenated nitrogen containing polyol of the formula defined above, an effective quantity of a catalyst for promoting the reaction between the polyisocyanate and the polyols, and a foaming agent.

15 Claims, No Drawings

NOVEL HALOGENATED ORGANIC COMPOUNDS, PROCESS FOR THE PRODUCTION OF SAME, AND POLYURETHANES CONTAINING SAME

FIELD OF THE INVENTION

The present invention pertains to new organic chemical compounds, to their method of preparation, and to their use in fire retardant compositions. The present invention is more particularly directed to new halogenated nitrogen containing polyols, to a process for their preparation, to their use as reactive polyols in preparing fire retardant polyurethanes, and to polyurethane compositions containing said novel polyols.

BACKGROUND OF THE INVENTION

Polyurethane foams have found wide and varied uses in industry. For example, the utility of flexible and semi-flexible foams in cushioning and furniture construction and the great advantage of rigid foams in construction and insulation are now well-known. However, the range of utility of these foams has been somewhat limited by their flammability. Numerous attempts have, consequently, been made to impart flame retardance to these materials.

Polyurethane compositions containing various flame retardant additives are widely known. Most of these compositions contain non-reactive additives, that do not chemically combine with other constituents of the macromolecular chain. More recently there have appeared a number of reactive constituents, that chemically combine to form part of the polyurethane framework in the flame retardant foam. In most cases, the reactive additive constitutes the polyol or polyester component of the system that ultimately forms the polyurethane macromolecular network.

Halogenated polyether polyols have been used as flame retardants in polyurethane foams. For example, U.S. Pat. Nos. 3,741,921, 3,244,754 and 3,269,961 disclose the use of an adduct of 4,4,4-trichloro-1,2-epoxybutane and selected polyhydric alcohols in the preparation of flame-retardant polyurethane foams. While the aforementioned polyethers do impart a degree of flame retardance to polyurethanes prepared therefrom, the problem of flammability in foams has not been eliminated by the use of these adducts.

U.S. Pat. Nos. 3,324,108 and 3,300,474 disclose the reaction of epichlorohydrin with dextrose and sucrose, respectively. U.S. Pat. No. 3,402,169 discloses polyhalogenated polyethers that are said to be useful in the preparation of flame retardant polyurethane foam, which polyethers are prepared by reacting a polyhalogenated alkylene oxide with any one of a variety of polyhydric initiators having two to eight hydroxy groups.

Addition products of 4,4,4-trichloro-1,2-epoxybutane with certain amines have also been reported. Thus, Canadian Pat. No. 527,462 reports the reaction of 4,4,4-trichloro-1,2-epoxybutane with ammonia, diethylamine and p-chloroaniline without disclosing any particular utility for these products. U.S. Pat. No. 3,325,476 discloses the reaction products of 4,4,4-trichloro-1,2-epoxybutane with a large excess of primary or secondary amines to give hydroxyolefin amines. These compounds are said to be useful as pesticides or as catalysts for the isocyanate-alcohol reaction to produce polyurethane coatings, castings or foams. They may also serve as intermediates in the preparation of unsaturated monomers.

SUMMARY OF THE INVENTION

The present invention relates to a new class of halogenated nitrogen containing polyols having use as reactive fire retardants, particularly in polyurethanes. The new halogenated nitrogen containing polyols of the present invention may be represented by the following formula:

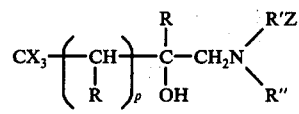

wherein
R designates hydrogen or an alkyl group of 1 to 6 carbon atoms, inclusive, preferably methyl;
R' designates an alkylene group of 2 to 10 carbon atoms, inclusive, preferably ethylene, or alkylene substituted with a methyl or halomethyl group;
R" designates hydrogen, an alkyl group having 1 to 4 carbon atoms, inclusive;
—R'Z,

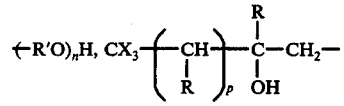

or —C(CH$_2$OH)$_3$;
X is chlorine or bromine;
Z is —OH,

or —(OR')$_n$H,
n is an integer from 1 to 5, preferably 1 (R' need not be identical when n is greater than 1); and
p is an integer from 0 to 4, preferably 1.

The novel halogenated nitrogen containing polyols of the present invention may be prepared by reacting one mole or a small excess of a trihalogenated alkylene oxide having the formula

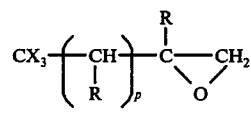

wherein X, R, and p have the meanings stated above, per mole of an alkanolamine or polyamine of the formula

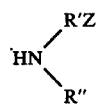

wherein R'Z, and R" have the meanings stated above. The reaction proceeds without any catalyst and without solvent. However, it is sometimes advantageous, to use solvents, particularly when the reaction is very fast.

Suitable solvents are, for example, benzene, toluene, ethanol, isopropanol, acetone, ether or similar solvents which are inert to the reaction.

The trihalogenated alkylene oxides may be added to the alkanolamine or polyamine directly or as a solution in a suitable solvent. The temperature of the reaction may be as low as 30° C. and as high as 90° C., with a preferred temperature being the reflux temperature of the solution.

The stoichiometry of the reaction requires at least one molecular equivalent of trihalogenated alkylene oxide for each mole of amine; however, a slight molar excess of the trihalogenated alkylene oxide is preferred. An excess of up to about 20–30 percent gives satisfactory results.

When reacting the trihaloalkylene oxide with a monoalkanolamine or a polyamine having more than one hydrogen to nitrogen bond, a preferred embodiment of this invention consists of reacting in addition to the trihaloalkylene oxide a non-halogenated alkylene oxide or monohalogenated alkylene oxide with the mono-alkanolamine or polyamine. This may be done by mixing the alkylene oxides prior to reacting with the amine, or simultaneously adding the different alkylene oxides to the amine. Similarly, the different alkylene oxides can be added consecutively or alternately.

It is worthy to note that under the reaction conditions and stoichimetry contemplated by the present invention, very little inorganic chloride is formed in the reaction product, and dehydrohalogenation does not take place.

The trihalogenated alkylene oxides which are employed as starting materials are vicinal alkylene oxides containing from three to sixteen carbon atoms, and containing three halogen atoms attached to the terminal carbon atom. The preferred trihalogenated alkylene oxide is 4,4,4-trichloro-1,2-epoxybutane, which can be employed in the purified form or as a component of a crude reaction mixture as described in U.S. Pat. No. 3,726,855. Other examples of trihalogenated alkylene oxides which may be used in the present invention are as follows:
4,4,4-tribromo-2-methyl-1,2-epoxybutane
5,5,5-trichloro-1,2-epoxypentane
6,6,6-trichloro-1,2-epoxyhexane
5,5,5-trichloro-3-methyl-1,2-epoxypentane
5,5,5-trichloro-2,3-dimethyl-1,2-epoxypentane
6,6,6-trichloro-4-methyl-1,2-epoxyhexane
6,6,6-trichloro-3,4-dimethyl-1,2-epoxyhexane
6,6,6-trichloro-2,3,4-trimethyl-1,2-epoxyhexane
6,6,6-trichloro-3-methyl-1,2-epoxyhexane
5,5,5-trichloro-3-isopropyl-1,2-epoxypentane
5,5,5-trichloro-3-hexyl-1,2-epoxypentane
and the like. Mixtures of the above compounds may also be employed.

Examples of alkanolamines which may be used in the present invention are the simple mono-or dialkanolamines or mixed alkanolamines as follows:
HOCH$_2$CH$_2$NH$_2$
(HOCH$_2$CH$_2$)$_2$NH
HOCH$_2$CH$_2$CH$_2$NH$_2$

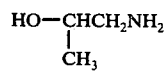

(HOCH$_2$CH$_2$CH$_2$)$_2$NH

HOCH$_2$CH$_2$CH$_2$CH$_2$NH$_2$
(HOCH$_2$CH$_2$CH$_2$CH$_2$)$_2$NH

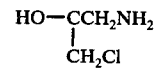

HOCH$_2$CH$_2$NH(CH$_3$)
HOCH$_2$CH$_2$NH(C$_2$H$_5$)
HOCH$_2$CH$_2$NH(CH$_2$CH$_2$CH$_2$OH)
(HOCH$_2$)$_3$CNH$_2$
HOCH$_2$CH$_2$NH(CH$_2$CH$_2$OCH$_2$CH$_2$OH)

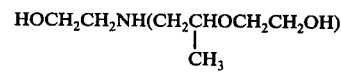

These alkanolamines are generally prepared by the alkoxylation of ammonia, and the more common commercial alkanolamines are ethoxylated and propoxylated ammonium derivatives. For practical considerations, mono- and di-ethanolamine are preferred, with diethanolamine being most preferred.

Examples of polyamines which may be used in the present invention are ethylenediamine, diethylene triamine, triethylene tetramine, 1,3-butane diamine, 1,3-propanediamine, 1,4-butanediamine, and the like; with ethylene diamine and diethylene triamine being preferred.

The non-halogenated or monohalogenated alkylene oxides which can be reacted simultaneously or consecutively together with the trihalogenated alkylene oxides and amines as envisioned by this invention can be any 1,2-epoxyalkane optionally containing a halogen substituent. Examples of such alkylene oxides include ethylene oxide, propylene oxide, butylene oxide, hexylene oxide, cyclohexene oxide, epichlorohydrin and the like; with propylene oxide being preferred.

The novel halogenated nitrogen polyols of the present invention can be used as reactive fire retardants, particularly in rigid polyurethane foams.

Polyurethane foams are prepared by reacting the novel halogenated nitrogen containing polyols of the present invention, optionally mixed with other polyols, with an organic polyisocyanate in the presence of a foaming agent, a reaction catalyst, and, preferably, a silicone surfactant.

Any of the widely known organic polyisocyanates can be employed in the preparation of the polyurethane foams of this invention, for example tolylene diisocyanate, which is a mixture of about 80 percent by weight of 2,4-tolylene diisocyanate and 20 percent by weight of the 2,6-isomer. Other typical isocyanates include, but are not limited to the following: methylene-bis-(4-phenyl isocyanate), 3,3'-bitolylene-4,4'-diisocyanate, 3,3'-dimethoxy-4,4'-biphenylene diisocyanate, naphthalene-1,5-diisocyanate, hexamethylene diisocyanate, 1,4-phenylene diisocyanate, polyphenylene polymethylene isocyanate and the like. The amount of isocyanate employed in the preparation of the polyurethane foams should be sufficient to provide at least about 0.7 NCO group per hydroxyl group present in the reaction system. This includes the number of hydroxyl groups present in the polyol and the surfactant compounds of the present invention, the number of hydroxyl groups in any additives employed, and the number of hydroxyl groups employed in the foaming agent. An excess of isocyanate compound may be conveniently employed;

however, this is generally undesirable due to the high cost of the isocyanate compound. It is preferable, therefore, to employ sufficient isocyanate to provide no greater than about 1.5 NCO groups per hydroxyl group, and preferably between about 0.9 and 1.1 NCO groups per hydroxyl group.

The polyurethane foams are prepared in the presence of a foaming agent, reaction catalyst, and preferably a small proportion of a conventional silicone surfactant. The foaming agent employed can be any of those known to be useful for this purpose, such as water, the halogenated hydrocarbons, and mixtures thereof. Typical halogenated hydrocarbons include, but are not limited to, the following: monofluorotrichloromethane, difluoro dichloromethane, 1,1,2-trichloro-1,2,2-trifluoroethane, methylene chloride, chloroform, and carbon tetrachloride. The amount of foaming agent employed can be varied within a wide range. Generally, however, the halogenated hydrocarbons are employed in an amount from 1 to 50 parts by weight per 100 parts by weight of the polyol and generally water is employed in an amount of from 0.1 to 10 parts by weight per 100 parts by weight of the polyol.

The polyurethane foams are prepared in the presence of a catalytic amount of a reaction catalyst. The catalyst employed can be any of the catalysts known to be useful for this purpose, or mixture thereof, including tertiary amines and metallic salts. Typical tertiary amines include, but are not limited to, the following: N,N,N',N'-tetramethyl-butanediamine. N-methyl morpholine, N-hydroxyethyl morpholine, triethylene diamine, triethylamine and, trimethylamine. Typical metallic salts include, for example, the salts of antimony, lead, tin and iron, e.g. dibutylin dilaurate, stannous octoate, and the like. Generally speaking, the catalyst is employed in an amount ranging between about 0.05 and about 1.0, and preferably between about 0.075 and about 0.15 percent by weight of the polyol.

It is preferred in the preparation of the polyurethane compounds of the present invention to employ minor amounts of a conventional polyurethane foam surfactant in order to further improve the cell structure of the polyurethane foam. Typical of such surfactants are the silicone oils and soaps. Generally up to 2 parts by weight of the surfactant is employed per 100 parts of the polyol.

Various additives can be employed which serve to provide different properties, e.g. fillers such as clay, calcium sulfate, or ammonium phosphate may be added to lower cost and improve physical properties. Ingredients such as dyes may be added for color, and fibrous glass, asbestos, cotton, ramie or synthetic fibers may be added for strength. In addition, plasticizers, deodorants and antioxidants may be added. These components are readily reacted in the customary "one-shot" manner to yield a polyurethane foam having excellent physical properties. However, if desired, the "prepolymer" technique, and "quasi" prepolymer technique may also be employed to prepare the novel foams of this invention.

DESCRIPTION OF THE PREFERRED EMBODIMENTS

EXAMPLE 1

To a solution of 52.5g (0.5 mole) diethanolamine in 100 ml ethanol heated to reflux was added 87.7g (0.5 mole) 4,4,4-trichloro-1,2-epoxybutane over a period of 105 minutes. After refluxing with agitation for an additional 5 hours the solvent was removed via vacuum leaving 135.7g (96.5%) of N,N-bis(2-hydroxyethyl)-4,4,4-trichloro-2-hydroxy-1-butylamine, a clear dark, highly viscous liquid; hydroxyl number = 600. This product is soluble in water (pH≈8) and in xylene. Analysis: (Calculated) %N, 5.00; %Cl, 37.96. (Found) %N, 5.00; %Cl, 37.09.

EXAMPLE 2

To a solution of 30.6g (0.5 mole) monoethanolamine in 150 ml isopropanol heated to reflux was slowly added 33.8g (0.58 mole) propylene oxide over a period of about one hour. After refluxing the mixture overnight the solvent and unreacted starting material were distilled off, affording a residue weighing 49.1g. To this residue was added 5.7g of the unreacted monoethanolamine distillate. To this mixture was added 90g (0.51 mole) 4,4,4-trichloro-1,2-epoxybutane over a period of 45 minutes. An equivolume amount of methanol was then added and the reaction mixture refluxed overnight. Evaporation of the solvent yielded 140.8g (95.5%) of N-(2-hydroxyethyl)-N-(2-hydroxypropyl)-4,4,4-trichloro-2-hydroxy-1-butylamine, a brown viscous liquid very soluble in methanol but only slightly soluble in water(pH 7–8); hydroxyl number = 564. Analysis: (Calculated) %N 4.79; %Cl, 36.35. (Found) %N, 4.56; %Cl, 36.92.

EXAMPLE 3

To a solution of 10.0g (0.17 mole) ethylene diamine in 150 ml isopropanol, maintained under nitrogen at reflux, was added, dropwise, 129g (0.71 mole) 4,4,4-trichloro-1,2-epoxybutane over a period of 2.5 hours. After refluxing with agitation under nitrogen for an additional seven hours the solvent was removed via vacuum affording 126.9g (100%) of N,N,N',N'-tetrakis (4,4,4-trichloro-2-hydroxybutane)-ethylene diamine; hydroxyl number = 295. Analysis: (Calculated) %N, 3.67; %Cl, 55.91. (Found) %N, 3.68; %Cl, 53.35.

EXAMPLE 4

To a solution of 10.0g (0.17 mole) ethylene diamine in 150 ml isopropanol kept at 50° C. was added slowly with agitation 29g (0.50 mol) propylene oxide over a period of five minutes. The reaction mixture was refluxed for eight hours and, after standing overnight, a further two hours at 70° C., and the solvent then removed via vacuum. The water white residue weighed 35.8g. To this residue dissolved in 150 ml methanol was subsequently added 45g (0.26 mole) 4,4,4-trichloro-1,2-epoxybutane over a period of about ten minutes. The reaction mixture was then refluxed overnight and the solvent removed via vacuum to yield 74.3g of an addition product between ethylenediamine, 2-hydroxypropane, and 4,4,4-trichloro-2-hydroxybutane; hydroxyl number = 541. Analysis: (Calculated) %Cl, 31.09; (Found) %Cl, 31.82. On the basis of the analytical data one mole of ethylenediamine reacted with two and two thirds mole propylene oxide and one and one third mole 4,4,4-trichloro-1,2-epoxybutane.

EXAMPLE 5

To a solution of 10.0g (0.17 mole) ethylenediamine in 100 ml isopropanol and 50 ml ethanol heated at 60° C. under nitrogen was added, dropwise, a mixture of 58.5g (0.33 mole) 4,4,4-trichloro-1,2-epoxybutane and 58.5g (1.0 mole) propylene oxide over a period of one hour. The reaction mixture was refluxed at 70° C. for one hour and an additional 17.2g (0.30 mole) of propylene oxide was then added dropwise. Refluxing with agitation was continued for an additional five hours and the mixture allowed to stand overnight. Evaporation of the solvent via vacuum afforded 74g of an addition product between ethylenediamine, 2-hydroxypropane, and 4,4,4-trichloro-2-hydroxybutane; hydroxyl number = 518. Analysis: (Calculated) %Cl, 29.52; %N, 6.47. (Found) %Cl, 29.22; %N, 6.31. On the basis of the analytical data one mole of ethylenediamine reacted with 1.2 moles 4,4,4-trichloro-1,2-epoxybutane and 2.8 moles propylene oxide.

EXAMPLE 6

Following the method of example 5 but using only 150 ml isopropanol, adding the mixture of 4,4,4-trichloro-1,2-epoxybutane and propylene oxide over a period of two hours, subsequently adding during reflux an additional 100 ml of solvent and 43.0g (0.74 mole) propylene oxide, and refluxing over a period of five days for a total of 17 hours, there was obtained after removal of the solvent 81.8g (93%) of an addition product between ethylenediamine, 2-hydroxypropane and 4,4,4-trichloro-2-hydroxybutane; hydroxyl number = 295. Analysis: (Calculated) %Cl, 36.56; %N, 5.72. (Found) %Cl 35.20; %N, 5.56. On the basis of the analytical data one mole of ethylene diamine reacted with 1.68 moles of 4,4,4-trichloro-1,2-epoxybutane and 2.32 moles propylene oxide.

EXAMPLE 7

To a solution of 20.64g (0.2 mole) diethylene triamine in 150 ml isopropanol heated to 60° C. was added, dropwise over a period of thirty minutes, 40.6g (0.70 mole) propylene oxide and the mixture refluxed overnight. The solvent was then removed via vacuum affording a residue of 58.1g. To this residue dissolved in 150 ml methanol was added, at reflux, 65g (0.37 mole) 4,4,4-trichloro-1,2-epoxybutane dropwise over a period of one hour and the reaction mixture refluxed overnight. Removal of the solvent yielded 116.7g of a clear semi-solid addition product between diethylene triamine, 2-hydroxypropane and 4,4,4-trichloro-2-hydroxybutane; hydroxyl number = 466. Analysis: (Calculated) %Cl, 30.13; %N, 6.12. (Found) %Cl, 29.18; %N, 6.31. On the basis of the analytical data one mole of diethylene triamine reacted with 1.5 moles 4,4,4-trichloro-1,2-epoxybutane and 3.5 moles propylene oxide.

EXAMPLES 8–15

A series of polyurethane foams were prepared containing a blend of the novel halogenated nitrogen containing polyols of the present invention, optionally in mixture with other polyols, an organic polyisocyanate, a foaming agent, a reaction catalyst, and a silicone surfactant. The flammability of the resulting foams were evaluated by means of the Oxygen Index Test [ASTM-D2863-70]. Details of the formulations and the results of the flammability tests of these foams are listed in Table 1.

TABLE 1
FORMULATIONS AND FLAMMABILITY OF POLYURETHANE FOAMS

| EXAMPLE | POLYOL FROM EXAMPLE NO. | GRAMS | ATLAS 2410[a] (grams) | DC-193[b] (grams) | F-11[c] (grams) | DMCHA[d] (cc) | D-22[e] (cc) | PAPI-135[f] (grams) | CREAM TIME (sec.) | RISE TIME (sec.) | % Cl IN FOAM | DENSITY (kg/m$^3$) | STRENGTH (kg/cm$^2$) | LOI ($\times 10^2$) |
|---|---|---|---|---|---|---|---|---|---|---|---|---|---|---|
| 8 | 1 | 100 | — | 1.5 | 48 | 0.25 | 0.04 | 144 | 10 | 60 | 14.1 | 27.0 | 1.72 | 30.7 |
| 9 | 2 | 100 | — | 1.5 | 55 | — | 0.4 | 135 | 12 | 65 | 13.85 | 21.6 | 1.24 | 28.0 |
| 10 | 2 | 72 | 28 | 1.5 | 44 | — | 0.16 | 130 | 22 | 100 | 10.6 | 29.5 | 1.55 | 26.1 |
| 11 | 4 | 100 | — | 1.5 | 49 | 0.4 | — | 130 | 33 | 150 | 12.34 | 28.8 | 1.35 | 27.5 |
| 12 | 4 | 72 | 28 | 1.5 | 56 | 0.4 | — | 115 | 22 | 150 | 9.15 | 21.4 | 0.97 | 24.7 |
| 13 | 5 | 72 | 28 | 1.5 | 44 | 0.4 | — | 110 | 30 | 130 | 8.02 | 26.7 | 1.27 | 24.7 |
| 14 | 6 | 72 | 28 | 1.5 | 46 | 0.4 | — | 112 | 37 | 165 | 10.9 | 25.7 | 1.4 | 23.6 |
| 15 | 7 | 100 | — | 1.5 | 60 | — | 0.16 | 112 | 13 | 55 | 12.2 | 21.4 | 1.07 | 27.2 |

[a]Sorbitol polyol.
[b]Dow silicone surfactant.
[c]Freon-11 or equivalent blowing agent.
[d]Dicyclohexylamine catalyst.
[e]Dibutyltin dilaurate catalyst.
[f]Upjohn polymeric MDI.

We claim:
1. Compounds of the formula

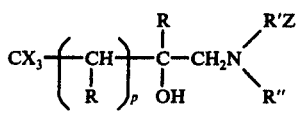

wherein:
R designates hydrogen or an alkyl group of 1 to 6 carbon atoms, inclusive;
R' designates an alkylene group of 2 to 10 carbon atoms, inclusive, or alkylene substituted by a methyl or by a halomethyl group;
R'' designates hydrogen, an alkyl group of 1 to 4 carbon atoms, inclusive,
—R'Z,

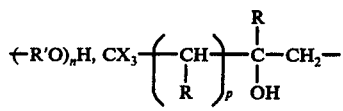

or C(CH$_2$OH)$_3$;
X designates chlorine or bromine;
Z designates —OH,

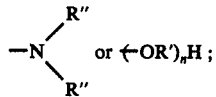

or $(\text{OR'})_n\text{H}$;

n is an integer from 1 to 5 (R' not necessarily being identical); and
p is an integer from 0 to 4.
2. Compounds according to claim 1 wherein R is hydrogen.
3. Compounds according to claim 1 wherein p is 1.
4. Compounds according to claim 1 wherein X is chlorine.
5. Compounds according to claim 1 wherein R' is —CH$_2$CH$_2$—.

6. Compounds according to claim 1 wherein R'' is

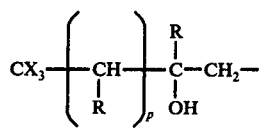

wherein R and p are as defined in claim 1.
7. Compounds according to claim 1 wherein Z is —OH or

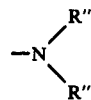

8. A compound according to claim 1, N,N-bis(2-hydroxethyl)-4,4,4-trichloro-2-hydroxy-1-butylamine.
9. A compound according to claim 1, N-(2-hydroxyethyl)-N-(2-hydroxypropyl)-4,4,4-trichloro-2-hydroxy-1-butylamine.
10. A compound according to claim 1, N,N,N',N'-tetrakis (4,4,4-trichloro-2-hydroxybutyl)-ethylene diamine.
11. A compound according to claim 1, N,N-bis(2-hydroxypropyl)-N',N'-bis(4,4,4-trichloro-2-hydroxybutyl)-ethylene diamine.
12. A compound according to claim 1, N-(2-hydroxypropyl)N,N',N'-tris(4,4,4-trichloro-2-hydroxybutyl)-ethylene diamine.
13. A compound according to claim 1, N,N-bis-(2-hydroxypropyl)-N',N'-bis-(4,4,4-trichloro-2-hydroxybutyl)-diethylene triamine.
14. A polyhalogenated nitrogen containing polyol being the reaction product of ethylene diamine with propylene oxide and 4,4,4-trichloro-1,2-epoxybutane in a molar ratio of from 1:3:1 to 1:1:3, respectively.
15. A polyhalogenated nitrogen containing polyol being the reaction product of diethylenetriamine with propylene oxide and 4,4,4-trichloro-1,2-epoxybutane in a molar ratio of from 1:4:1 to 1:1:4, respectively.

* * * * *